United States Patent
Meng et al.

(10) Patent No.: US 10,270,694 B2
(45) Date of Patent: Apr. 23, 2019

(54) CONTROL MESSAGE ROUTING STRUCTURE FOR A CONTROLLER AREA NETWORK

(71) Applicant: Marvell World Trade Ltd., St. Michael (BB)

(72) Inventors: Dehuan Meng, Beijing (CN); Biing Long Shu, Singapore (SG); Hugh Walsh, Los Gatos, CA (US); Fei Wu, Beijing (CN)

(73) Assignee: Marvell World Trade Ltd., St. Michael (BB)

( * ) Notice: Subject to any disclaimer, the term of this patent is extended or adjusted under 35 U.S.C. 154(b) by 64 days.

(21) Appl. No.: 15/363,957

(22) Filed: Nov. 29, 2016

(65) Prior Publication Data
US 2017/0155585 A1 Jun. 1, 2017

Related U.S. Application Data

(60) Provisional application No. 62/261,583, filed on Dec. 1, 2015, provisional application No. 62/261,611, filed
(Continued)

(51) Int. Cl.
*H04L 12/741* (2013.01)
*H04L 12/40* (2006.01)
(Continued)

(52) U.S. Cl.
CPC .......... *H04L 45/745* (2013.01); *B60R 16/023* (2013.01); *H04L 12/40* (2013.01);
(Continued)

(58) Field of Classification Search
CPC ....... H04L 12/40; H04L 45/16; H04L 45/745; H04L 2012/40215; H04L 43/106;
(Continued)

(56) References Cited

U.S. PATENT DOCUMENTS

| 5,524,213 A | 6/1996 | Dais et al. |
| 6,563,832 B1 * | 5/2003 | Stuart ................... H04L 12/417 370/403 |

(Continued)

FOREIGN PATENT DOCUMENTS

| EP | 1 916 813 | 4/2008 |
| EP | 2 712 123 | 3/2014 |

(Continued)

OTHER PUBLICATIONS

Barranco, et al., Boosting the Robustness of Controller Area Networks CANcentrate and ReCANcantrate, Computer, IEEE, Computer Society, vol. 42, No. 5, May 1, 2009.
(Continued)

*Primary Examiner* — Paul H Masur
*Assistant Examiner* — Michael K Phillips

(57) ABSTRACT

Systems and methods are provided for routing a message in a network. A bit length of an identifier field of a received message is identified. A lookup table is selected based on the bit length of the identifier field. The identifier field is used as a reference for the lookup table to identify a bus for the message, and the message is forwarded to the bus.

16 Claims, 5 Drawing Sheets

Related U.S. Application Data on Dec. 1, 2015, provisional application No. 62/261,629, filed on Dec. 1, 2015.

(51) Int. Cl.

| | | |
|---|---|---|
| *H04L 12/761* | (2013.01) | |
| *H04L 12/26* | (2006.01) | |
| *H04L 12/755* | (2013.01) | |
| *H04L 12/841* | (2013.01) | |
| *H04L 12/46* | (2006.01) | |
| *H04L 12/66* | (2006.01) | |
| *B60R 16/023* | (2006.01) | |

(52) U.S. Cl.
CPC .. *H04L 12/40143* (2013.01); *H04L 12/40163* (2013.01); *H04L 12/4625* (2013.01); *H04L 12/4633* (2013.01); *H04L 12/4662* (2013.01); *H04L 12/66* (2013.01); *H04L 43/106* (2013.01); *H04L 45/021* (2013.01); *H04L 45/16* (2013.01); *H04L 45/54* (2013.01); *H04L 47/28* (2013.01); *H04L 2012/40215* (2013.01)

(58) Field of Classification Search
CPC . H04L 45/021; H04L 47/28; H04L 12/40143; H04L 12/40163; H04L 12/4625; H04L 12/4662; H04L 12/4633; H04L 12/66; H04L 45/54; B60R 16/023
See application file for complete search history.

(56) References Cited

U.S. PATENT DOCUMENTS

| | | | |
|---|---|---|---|
| 7,307,994 B2 | 12/2007 | Kurita | |
| 8,650,356 B2 | 2/2014 | Wilson et al. | |
| 9,191,467 B2 | 11/2015 | Triess et al. | |
| 2003/0058864 A1* | 3/2003 | Michels | H04L 12/56 370/392 |
| 2006/0109376 A1 | 5/2006 | Chaffee et al. | |
| 2006/0271694 A1* | 11/2006 | Matsuo | H04L 12/4135 709/229 |
| 2007/0140294 A1 | 6/2007 | Takatori | |
| 2008/0162860 A1 | 7/2008 | Sabbatini et al. | |
| 2009/0240383 A1* | 9/2009 | Hung | B60R 25/24 701/1 |
| 2010/0329272 A1* | 12/2010 | Tsuboi | H04L 12/40163 370/401 |
| 2014/0036693 A1* | 2/2014 | Mabuchi | H04L 43/10 370/243 |
| 2014/0036922 A1 | 2/2014 | Yousefi | |
| 2014/0146666 A1 | 5/2014 | Kwan et al. | |
| 2014/0211803 A1 | 7/2014 | Yousefi | |
| 2014/0215109 A1 | 7/2014 | Hopfner | |
| 2014/0258571 A1 | 9/2014 | Hartwich et al. | |
| 2014/0379954 A1* | 12/2014 | Hayashi | H04L 45/00 710/310 |
| 2015/0003443 A1 | 1/2015 | Koenigseder et al. | |
| 2015/0003456 A1 | 1/2015 | Seo | |
| 2015/0019897 A1* | 1/2015 | Horihata | H04L 12/40039 713/324 |
| 2015/0370535 A1 | 12/2015 | Ralston | |
| 2016/0197944 A1 | 7/2016 | Allouche et al. | |
| 2017/0072876 A1* | 3/2017 | Rajan | G06F 13/4282 |
| 2017/0118038 A1* | 4/2017 | Ujiie | H04B 1/3822 |
| 2017/0131610 A1 | 5/2017 | Brown et al. | |

FOREIGN PATENT DOCUMENTS

| | | |
|---|---|---|
| EP | 2 863 588 | 4/2015 |
| WO | WO 01/45348 | 6/2001 |

OTHER PUBLICATIONS

Barranco, et al., ReCANcentrate a Replicated Star Topology for CAN Networks, 10th IEEE International Conference on Emerging Technnologies and Factory Automation, IEEE, vol. 2 Sep. 19, 2005.

Herber et al., Real-Time Capable CAN to AVB Ethernet Gateway Using Frame Aggregation and Scheduling, Technische Universität München, Institute for Integrated System, Münich, Germany, Mar. 9, 2015.

IEEE Std 802.1AS™-2011, "IEEE Standard for Local and Metropolitan Area Networks—Timing and Synchronization for Time-Sensitive Applications in Bridged Local Area Networks," IEEE Computer Society, Mar. 30, 2011.

Kern, et al., Gateway Strategies for Embedding of Automative CAN-Frames into Ethernet-Packets and Vice Versa, Network and Parallel Computing, Lecture Notes in Computer Science, Feb. 24, 2011.

* cited by examiner

300

| | 360 | 362 |
|---|---|---|
| entry0 | 29bit ID | Other routing information |
| entry1 | 29bit ID | Other routing information |
| entry2 | 29bit ID | Other routing information |
| ⋮ | | |
| entryK | 29bit ID | Other routing information |

364 brackets entry0 through entryK

CONTROL MESSAGE ROUTING STRUCTURE FOR A CONTROLLER AREA NETWORK

CROSS-REFERENCE TO RELATED APPLICATIONS

This disclosure claims the benefit under 35 U.S.C. § 119(e) of U.S. Provisional Application No. 62/261,583, filed on Dec. 1, 2015, U.S. Provisional Application No. 62/261,611, filed on Dec. 1, 2015, and U.S. Provisional Application No. 62/261,629, filed on Dec. 1, 2015, each of which is incorporated herein by reference in its entirety.

FIELD OF USE

This disclosure relates generally to a framework for routing messages in a network, and more particularly to providing a routing structure for transmitting Controller Area Network (CAN) messages over CAN buses.

BACKGROUND

A CAN bus is a serial bus system, which was developed to be used as a field bus in an automation environment to exchange information between different electronic components. Ideally, this exchange occurs in real time and at a high security level. CAN buses are used in the on-board diagnostics (OBD)-II vehicle diagnostics standard, which has been mandatory for all cars sold in the United States since 1996. The CAN bus was developed to control actuators and receive feedback from sensors on various subsystems of a vehicle, including the engine control unit, airbags, antilock breaking, cruise control, power steering, audio systems, power windows, doors, and mirror adjustment.

SUMMARY

In view of the foregoing, systems and methods are provided for routing a message in a network.

According to one aspect of the disclosure, a system comprises at least one processor configured to determine a bit length of an identifier field of a received message, select a lookup table based on the bit length of the identifier field, use the identifier field as a reference for the lookup table to identify a bus for the message, and forward the message to the bus.

In some implementations, the network is a Controller Area Network (CAN), the message is a CAN message, and the bus is a CAN bus. The identifier field may be a CAN identifier field. When the bit length of the identifier field is 11 bits the selected lookup table is a first lookup table, and when the bit length of the identifier field is 29 bits the selected lookup table is a second lookup table.

In some implementations, the at least one processor is coupled to a memory that stores a plurality of lookup tables including the selected lookup table, wherein each lookup table in the plurality of lookup tables is associated with a corresponding bit length of the identifier field.

In some implementations, the at least one processor select the lookup table by selecting a first lookup table when the bit length of the identifier field is a first number of bits, and selecting a second lookup table when the bit length of the identifier field is a second number of bits.

In some implementations, the selected lookup table has $2^B$ entries, B is the bit length of the identifier field, and the selected lookup table is indexed by the identifier field. In some implementations, the selected lookup table has K entries, K is less than $2^B$, and B is the bit length of the identifier field. The K entries in the selected lookup table may be arranged in ascending order.

In some implementations, the message is a first message and the bus is a first bus, and while the first message is being forwarded to the first bus, the at least one processor is further configured to identify a second identifier field of a second received message, and determine a second bit length of the second identifier field. The at least one processor may be further configured to select a second lookup table based on the second bit length of the second identifier field, use the second identifier field as a second reference for the second lookup table to identify a second bus for the second message, and forward the second message to the second bus.

According to one aspect of the disclosure, a method of routing a message in a network is described. The method comprises determining a bit length of an identifier field of a received message, selecting a lookup table based on the bit length of the identifier field, using the identifier field as a reference for the lookup table to identify a bus for the message, and forwarding the message to the bus.

In some implementations, the network is a Controller Area Network (CAN), the message is a CAN message, and the bus is a CAN bus. The identifier field may be a CAN identifier field. When the bit length of the identifier field is 11 bits the selected lookup table is a first lookup table, and when the bit length of the identifier field is 29 bits the selected lookup table is a second lookup table.

In some implementations, the method comprises storing a plurality of lookup tables including the selected lookup table in memory, wherein each lookup table in the plurality of lookup tables is associated with a corresponding bit length of the identifier field.

In some implementations, selecting the lookup table comprises selecting a first lookup table when the bit length of the identifier field is a first number of bits, and selecting a second lookup table when the bit length of the identifier field is a second number of bits.

In some implementations, the selected lookup table has $2^B$ entries, B is the bit length of the identifier field, and the selected lookup table is indexed by the identifier field. In some implementations, the selected lookup table has K entries, K is less than $2^B$, and B is the bit length of the identifier field. The K entries in the selected lookup table may be arranged in ascending order.

In some implementations, the message is a first message and the bus is a first bus, and while the first message is being forwarded to the first bus, the method further comprises identifying a second identifier field of a second received message, and determining a second bit length of the second identifier field. The method may further comprise selecting a second lookup table based on the second bit length of the second identifier field, using the second identifier field as a second reference for the second lookup table to identify a second bus for the second message, and forwarding the second message to the second bus.

BRIEF DESCRIPTION OF THE DRAWINGS

The above and other features of the present disclosure, including its nature and its various advantages, will be more apparent upon consideration of the following detailed description, taken in conjunction with the accompanying drawings in which.

DETAILED DESCRIPTION

This disclosure generally relates to improving speed of message routing, as well as providing a routing structure for efficient transmission of controller area network (CAN) messages. To provide an overall understanding of the disclosure, certain illustrative embodiments will now be described, including a routing structure for CAN messages. However, it will be understood by one of ordinary skill in the art that the systems and methods described herein may be adapted and modified as is appropriate for the application being addressed, and that the systems and methods described herein may be employed in other suitable applications (such as ID-based routing procedures), and that such other additions and modifications will not depart from the scope thereof.

Figure 1:
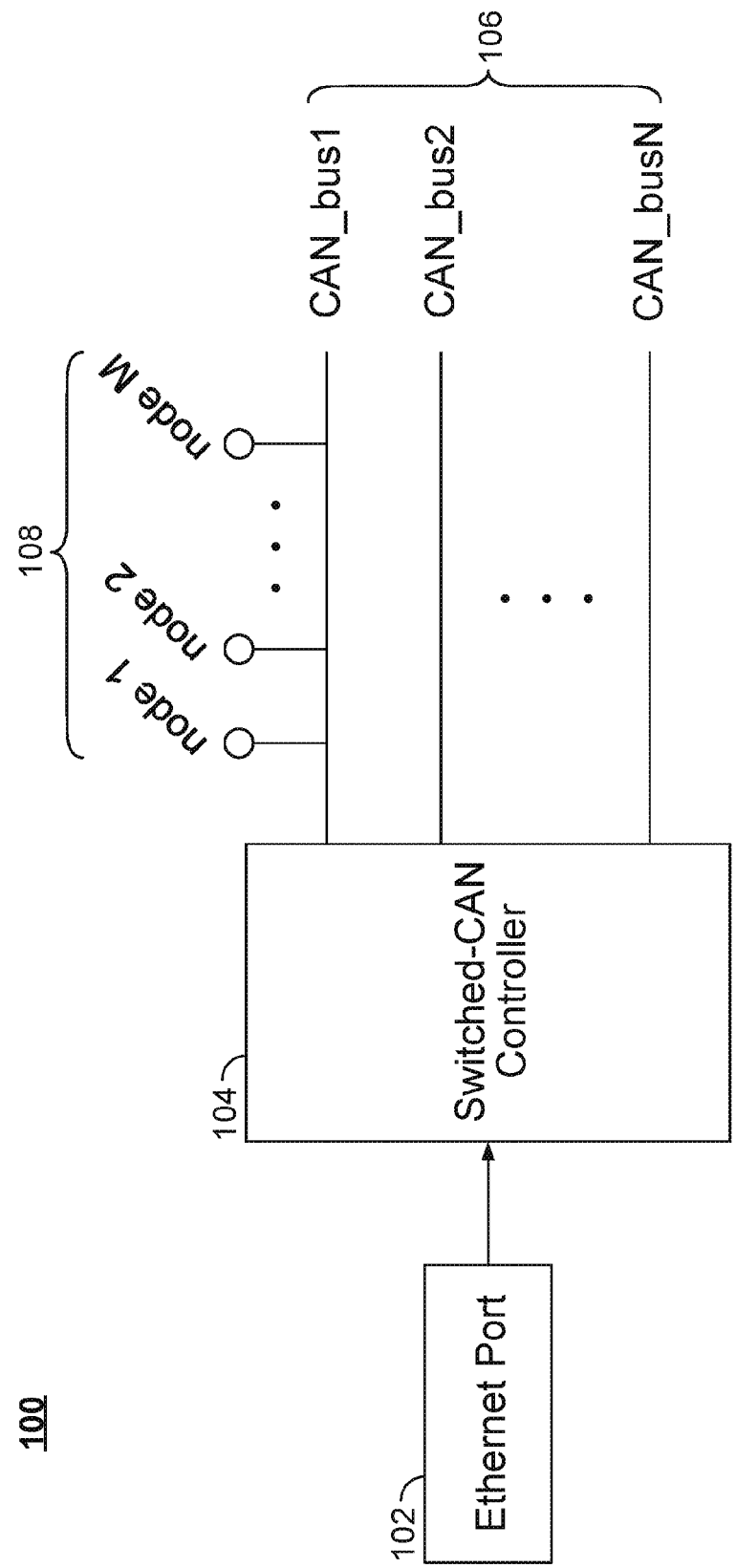
FIG. 1 is a diagram of an illustrative switched-CAN infrastructure, in accordance with an embodiment of the present disclosure.

FIG. 1 shows an illustrative diagram of a system 100 that includes a switched-CAN infrastructure, in accordance with an embodiment of the present disclosure. The system 100 includes an Ethernet port 102, a switched-CAN controller 104, a set of M nodes 108, and N CAN buses 106. The switched-CAN controller 104 includes at least one processor that may be used to perform any of the methods and processes described herein, including the routing processes described in relation to FIGS. 1-6. In vehicles, data transfer over a backbone network may involve using an Ethernet protocol. The Ethernet port 102 provides an interface to an Ethernet network (not shown), and the IEEE 1722 standard defines the behavior and format of how to transfer a CAN message between an Ethernet network and a CAN bus. Latency is an important consideration when transferring a CAN message from an Ethernet network to a CAN bus, and the systems and methods of the present disclosure provide ways to reduce this latency.

The system 100 may be included in an automotive system. Automotive Ethernet is a physical wired network that connects components within a vehicle (e.g., a car). With a vehicle that uses automotive Ethernet, various chips may be connected to a set of CAN buses. However, the sources that control the chips may not be directly connected to the CAN buses. Instead, the sources may generate Ethernet data packets, which are routed through the automotive Ethernet network in the vehicle and are eventually converted from Ethernet packets to CAN packets and transmitted over the CAN buses.

IEEE 1722 is an emerging standard that specifies the message structure for how CAN messages get packetized but does not inform how the messages should be routed. The systems and methods of the present disclosure may be applied to routing an incoming Ethernet packet to one or more CAN buses. It is possible to transmit over multiple CAN buses at the same time because a CAN message may have multiple destinations.

In FIG. 1, the M nodes 108 are connected to the N CAN buses 106. While depicted in FIG. 1 as if each of the M nodes 108 is connected to the first CAN bus 106, in general, each node 108 may be connected to a different set of one or more CAN buses 106, and each CAN bus 106 may be connected to a different set of nodes 108. In the automotive Ethernet example described above, each of the nodes 108 is an electronic control unit (ECU) that may be connected to a CAN controller and at least one of six CAN buses 106. Each given CAN bus of the six CAN buses 106 may have any number of nodes 108 connected to the given CAN bus. By connecting multiple nodes 108 to a single CAN bus 106, the amount of wiring is reduced, saving on cost and complexity. In general, a shared bus may be desirable to have one central processor that controls multiple chips or nodes to perform various actions.

The system 100 receives an Ethernet packet over the Ethernet port 102. The Ethernet packet is forwarded to the switched-CAN controller 104, which converts the Ethernet packet into one or more CAN packets and forwards the CAN packets to one or more of the CAN buses 106. In particular, a CAN message is extracted from the Ethernet packet, and (in one implementation) two fields in the CAN message are used to determine the routing process. In particular, a CAN message includes can_id (e.g., a CAN message identifier, which is part of the CAN standard and may be 11 bits long or 29 bits long) and can_bus_id (e.g., a CAN bus identifier, which is part of the IEEE 1722 standard) fields. The routing process may depend on the bit length of the can_id. To accomplish a routing scheme with the shortest latency, the routing structure may be different based on the bit length of the can_id field. These fields and various example routing schemes are described in further detail in relation to FIGS. 2-6.

In some embodiments, a lookup table is used to determine the routing process for the CAN message. Example implementations that involve lookup tables are described in detail in relation to FIGS. 5 and 6. In an example, a first lookup table is used for the can_id and a second lookup table is used for the can_bus_id. These lookup tables may be stored in a memory or a database that is accessible by the switched-CAN controller 104. Each of the first and second lookup tables provide an N-bit vector, where each vector has one bit to represent one of the CAN buses 106. The logical AND of the two N-bit vectors is determined and provided as an N-bit port vector, which defines which of the CAN buses 106 to transmit the particular CAN message. For example, each bit in the N-bit port vector is a binary value that indicates whether to transmit the CAN message on the corresponding CAN bus 106. In an example, a 6-bit port vector may be [0 1 1 0 0 0]. In this case, when the 6-bit port vector is expressed in big endian, the CAN message is transmitted over the fourth and fifth CAN buses 106, and is not transmitted over the first, second, third, or sixth CAN bus 106.

One benefit of using lookup tables to determine the routing process is that the use of lookup tables is generally very efficient. When the lookup table is stored in memory, such as a random access memory (RAM), the use of the lookup table involves a simple read of the registers in the RAM, which may only take one cycle. Accordingly, lookup tables may be desirable in an environment where the routing process needs to be fast and conducted in real time.

As described above, the N-bit vectors provided by the two lookup tables are input into an AND gate, which outputs the resulting N-bit port vector. Rather than relying solely on a first N-bit vector that relates to the can_id, or solely on a second N-bit vector that relates to the can_bus_id, the AND logic requires that the corresponding CAN message has both a can_id that is intended for a particular destination, as well as a can_bus_id that is intended for a particular CAN bus 106. For example, different nodes 108 (e.g., different ECUs) may be programmed to receive the same can_id. However, the corresponding CAN message may only be intended for one of those nodes 108. In this case, the can_bus_id informs which physical CAN bus 106 is suitable for transmission, and, accordingly, which node 108 is the desired destination.

Figure 2:
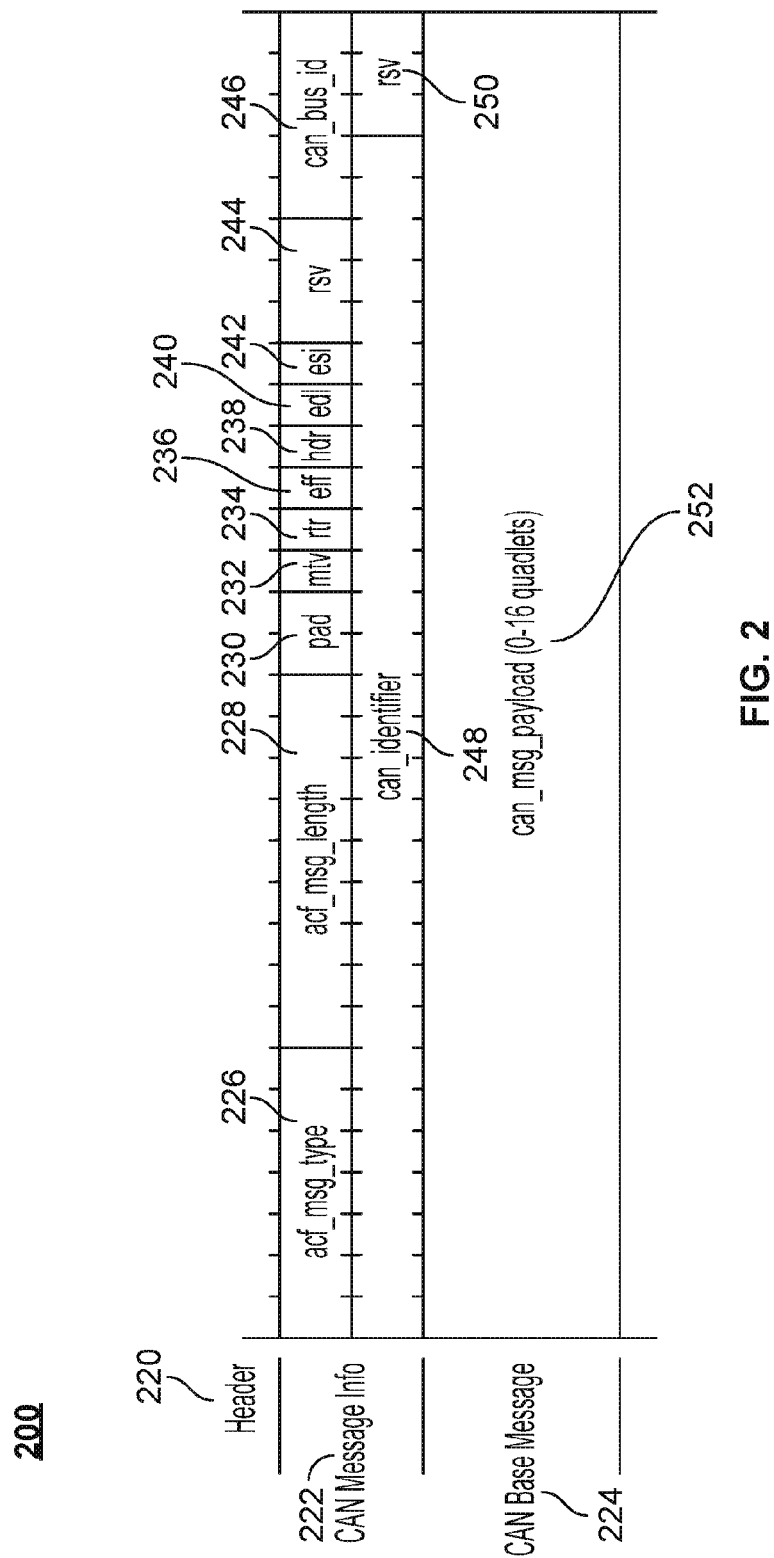
FIG. 2 is a diagram of an illustrative data frame with a CAN message, in accordance with an embodiment of the present disclosure.

FIG. 2 is a diagram of an illustrative data frame 200 with a CAN message, in accordance with an embodiment of the present disclosure. The data frame 200 may represent a portion of an IEEE 1722 frame, which refers to a kind of Ethernet frame. As depicted in FIG. 2, the data frame 200 includes a header 220, CAN message information 222, and a CAN base message 224. Each tick mark corresponds to one bit, and four bytes are shown in each row. The header 220 may span over multiple rows, such that more than four bytes are included in the header 220.

The eight bytes of CAN message information 222 shown in FIG. 2 include several fields related to the CAN message, including acf_msg_type 226, acf_msg_length 228, pad 230, mtv 232, rtr 234, eff 236, hdr 238, edl 240, esl 242, rsv 244, can_bus_id 246, can_id 248, and rsv 250. The eff field 236 represents an extended data length, and may be a flag that indicates whether the can_id 248 is 11 bits or 29 bits long. In particular, if the eff field 236 is one, the can_id 248 is 29 bits long, and if the eff field 236 is zero, the can_id 248 is 11 bits long. The can_id and can_bus_id fields are described in detail below. The CAN base message 224 in FIG. 2 includes payload data 252 related to the CAN message, and may include any number of bytes. In particular, the CAN base message 224 may include a variable number of bytes up to a specified maximum number of bytes.

An Ethernet frame may have multiple CAN messages embedded within the Ethernet frame. In an example, 10 CAN messages are embedded within a single Ethernet frame, and each message may be transmitted to the same or different set of one or more destinations (e.g., the nodes 108 via the CAN buses 106). In an example, the Ethernet frame includes multiple layers, where each layer has a corresponding header that identifies the Ethernet source and destination addresses. In an example, the header 220 in FIG. 2 includes the Ethernet header (which may include one of multiple formats, such as tagged or untagged) followed by an IEEE 1722 header (which may include one of multiple formats, such as TSCF or NTSCF). The data frame 200 only shows a portion of the Ethernet frame that includes information relevant to one CAN message. There may be another set of CAN message information and CAN base message below the data frame 200.

The data frame 200 may be used with an 11-bit or a 29-bit can_id in a manner such that routing is performed in real time. The can_id field 248 may be 11 bits long or 29 bits long, and is fully described in the CAN specification. In a CAN system, can_id serves at least two purposes. First, can_id may be used for a recipient to determine whether to receive the message. In particular, when multiple chips are connected to a single bus, not every message transmitted along the bus is meant to be received by each chip. In this case, the can_id is used for address filtering, so that the chips may determine whether the can_id matches a range of addresses that is programmed onto each chip. Second, can_id may be used for bus arbitration. In particular, multiple chips may attempt to transmit different CAN messages over the same bus at the same time. In one implementation, the CAN message with the lowest value for can_id wins control of the bus, and the other CAN messages are delayed and attempted to be sent again at a later time.

To route a CAN message, two routing tables may be used as lookup tables. A first routing table may be used to look up the can_id. A second routing table may be used to look up the can_bus_id. The second routing table has 2^A entries, where A is the bit length of the can_bus_id. In the IEEE 1722 standard, the can_bus_id is five bits long, such that the second routing table has 32 entries. The size and implementation of the first routing table may depend on whether the can_id is 11 bits or 29 bits long, and is described in detail below. The first and second lookup tables may each be implemented as a memory block, which involves very low latency to determine the appropriate routing.

When the can_id is 11 bits long, the first routing table has 2^11 (or 2048) entries, or one entry for each can_id. Because the first routing table is a lookup table that is indexed by the can_id itself, the lookup procedure for the 11-bit can_id involves reading a known address from a RAM, which takes a small number of cycles (e.g., one or two) in the RAM registers. Similarly, the 5-bit can_bus_id is used in a lookup procedure for the 32-entry routing table, which again involves reading a known address from a RAM and involves a small number of cycles. In most cases, since the can_bus_id and the can_id fields are each followed with at least four bytes of payload data, the lookup process may be initiated as soon as the can_bus_id or can_id is received. In particular, during the time that the four bytes of payload data are received, the routing for the can_bus_id and can_id may be performed. In this manner, the lookup process may finish while the four bytes of payload data following the can_bus_id or can_id are still being received. In this manner, the routing procedure does not add any additional latency at all, and is essentially done in real time.

As described above, the lookup process for the 11-bit can_id involves using the 11-bit can_id as an address to look up a corresponding entry in the first routing table, which has 2048 entries. Each entry includes an N-bit vector, which specifies which of the N CAN buses 106 are connected to nodes 108 that are intended destinations of the current CAN message. Similarly, the lookup process for the five-bit can_bus_id involves using the five-bit can_bus_id as an address to look up a corresponding entry in the second routing table, which has 32 entries. Each entry in the second routing table includes an N-bit vector, which specifies which of the N CAN buses 106 are suitable for transmitting the current CAN message. The two resulting N-bit vectors (from the first and second routing tables) are input into a logical AND gate, which outputs a final destination N-bit port vector that specifies which of the N CAN buses 106 to transmit the CAN message.

Example routing procedures for the 29-bit can_id are next described herein. The routing for a CAN message having a 29-bit can_id involves using a lookup table to get routing information. However, routing of the 29 bit can_id may be more complicated than the above-described routing of the message with 11-bit can_id, as a routing table with 2^29 entries may be unrealistic or undesirable to implement. To reduce the complexity of routing a CAN message with 29-bit can_id, possible implementations are described below in relation to FIGS. 3 and 4.

Figures 3, 4:
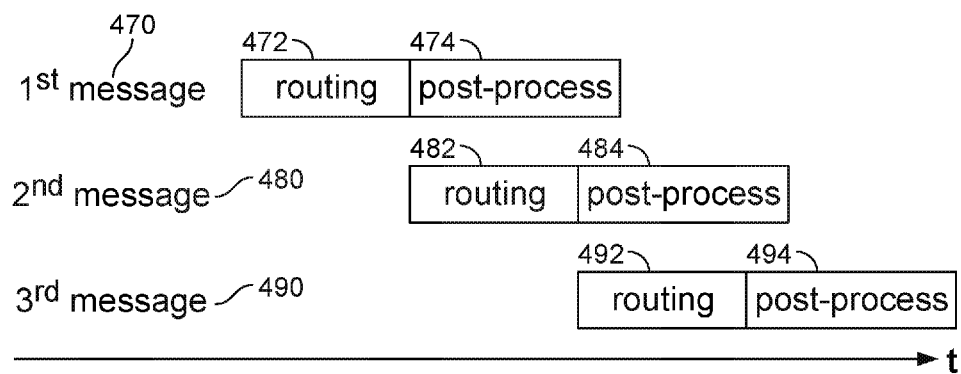
FIG. 3 is a diagram of an illustrative routing table for a long CAN identifier, in accordance with an embodiment of the present disclosure.
FIG. 4 is a diagram of an illustrative process for pipelined routing, in accordance with an embodiment of the present disclosure.

FIG. 3 is a diagram of an illustrative routing table 300 for rapid routing of a CAN message with a 29-bit can_id, in accordance with an embodiment of the present disclosure. Rather than including 2^29 entries, the routing table 300 may include a relatively small number K of entries. In contrast to the routing tables described above for the 11-bit can_id, the routing table 300 is not indexed by the 29-bit can_id. Instead, each of the K entries in the routing table 300 includes the 29-bit can_id as a first field 360 and other routing information as a second field 362. The other routing information in the second field 362 includes the first N-bit vector. Similar to the above described example for the 11-bit can_id, a second routing table (having 32 entries) is used to obtain a second N-bit vector from the can_bus_id. The first N-bit vector (obtained from the routing table 300) and the second N-bit vector (obtained from the can_bus_id routing table) are provided into a logical AND gate, which outputs a final destination N-bit port vector that specifies the suitable set of CAN buses 106 for the current CAN message.

In an example, K is a number that is determined based on the requirements of the system, and is the basis for how many of the 29-bit possible can_ids to support. For example, K may be equal to an integer such as 64, 128, 256, 512, 1048, or any other suitable number that is significantly less than 2^B, where B is the bit length of the can_id.

In some implementations, when the routing table 300 is initialized, the 29-bit can_id field 360 is arranged in ascending order. In this case, when a CAN message with a 29-bit can_id is received, a binary search may be done, which makes the lookup process significantly faster than performing a normal search. In particular, a binary search reduces the lookup time to $\log_2(K)$, where K is the number of entries in the routing table 300.

In contrast to the 11-bit can_id routing table, in which all possible can_ids are supported, the 29-bit can_id routing table only supports a small number of the possible can_ids. Because not all 2^29 possibilities are used, the set of K can_ids that are supported by the K-entry routing table may be determined by a system designer. In some implementations, K is set to a value that is just large enough for the particular application. For example, a car may have no more than 128 chips within its system. In this case, K may be set to 128 to ensure that each chip may be programmed to receive its own unique can_id. In general, the value of K may depend on the specific requirements of the system.

As depicted in FIG. 3, K can_ids are supported in the routing table 300. It may be tempting to then index the routing table by the first K can_ids. For example, when K is 128, the first K can_ids correspond to 0 to 127 in binary and may be fully represented by $\log_2(K)$ bits, or seven bits. Accordingly, these seven bits may be used to index the routing table 300, making the look-up process very efficient because it would involve only one read cycle of a memory block. However, such an implementation may be undesirable because the system designer may want to be able to specify which of the 29-bit can_ids to use, particularly for the bus arbitration purpose of the can_id field described above. Accordingly, by not indexing the routing table 300 in this manner, and by including the set of K 29-bit can-ids as a field 360 in the routing table 300, the present disclosure allows system designers to have the freedom to select which can_ids to use.

As is described in relation to the routing table 300, a can_id can sometimes have a long bit length. In this case, rather than implementing a routing table that supports all possible can_ids (which may be unfeasible or inefficient), a smaller selected number of the possible can_ids may be included as fields in the routing table. Moreover, these can_ids may be sorted in ascending (or descending) order in the routing table, such that a binary search may be performed to save on lookup time. In addition to the implementation of a routing table similar to the routing table 300, the timing of the routing and post-processing of sequentially received CAN messages may be pipelined in a manner that further improves efficiency.

FIG. 4 is a diagram 400 of an illustrative process for pipelined routing of a CAN message, in accordance with an embodiment of the present disclosure. In addition or as an alternative to the rapid routing described in relation to FIG. 3, pipelined routing of a CAN message with 29-bit can_id may be performed. In particular, after routing is complete, an additional post-processing time may be required in order to transmit the CAN message onto the appropriate CAN bus 106. To avoid the additional latency that the post-processing period adds to the routing process, a pipelined routing structure as shown in FIG. 4 may be implemented. This post-processing may involve adding the CAN message to a queue for a particular CAN bus 106, which may be performed at a CAN controller block such as the switched-CAN controller 104. The queuing process may not involve actual transmission of the CAN message onto the appropriate CAN bus 106, but rather just adding the CAN message to the necessary one or more queues. In general, this queuing process is independent from performing lookups of routing tables, such that queuing and performing lookups may be performed simultaneously without compromising accuracy. As described herein, pipelining may be applicable to a CAN message with 29-bit can_id but not a CAN message with 11-bit can_id. Because the above-described routing of the 11-bit can_id does not add any additional latency, pipelining may not be used for routing a CAN message with an 11-bit can_id.

In the diagram 400, a first CAN message 470, a second CAN message 480, and a third CAN message 490 are received sequentially over the Ethernet port 102. During a first time interval, the first message 470 is routed at 472. Once the appropriate CAN bus is identified for the first message 470, the first message 470 is transmitted to the CAN bus at 474, during which other post-processing may occur for the first message 470. While the post-processing 474 for the first message 470 occurs, the second message 480 is routed at 482. Similarly, while the second message 480 is post-processed at 484, the third message 490 is routed at 492 before being post-processed at 494.

In other words, if an additional message is received while one message is being post-processed, the routing of the additional message is performed without having to wait for the post-processing of the one message to be complete. By not requiring the system 100 to wait for the post-processing of one message to be complete before initiating the routing process of another message, the latency of the system 100 in processing received CAN messages is reduced.

The pipelined implementation shown in FIG. 4 may be particularly useful when the same Ethernet frame includes multiple CAN messages. In particular, because multiple CAN messages are received very quickly, there is a relatively short amount of time to perform the lookup procedures described herein. Once the table lookups are done and the destination port vector is obtained, the CAN message still needs to be queued onto the appropriate CAN buses 106. In some implementations, there are only eight bytes of Ethernet time (in other words, the CAN message part of the Ethernet frame is eight bytes long) to perform the table lookups, the AND operation, and the queuing before the next Ethernet frame is received. In general, according to the IEEE 1722 standard, there are 4*(P+1) bytes between the CAN identifiers of successive messages, where P is the number of payload quadlets and ranges from 0 to 16. When P is two, there are twelve bytes between the CAN identifiers.

By performing pipelining in the manner shown in FIG. 3, the first message 470 is queued onto the appropriate one or more CAN buses 106, while the lookup process is being simultaneously performed for the second message 480. If the parameters of the routing process (e.g., the clock frequency and the size of the table) are chosen appropriately, then the routing process may be performed at wire speed, or in real time as incoming data packets are received.

The amount of time it takes for the switched-CAN controller 104 to queue each CAN message onto a CAN bus 106 may be fixed and set by a third party. The pipelined approach shown in FIG. 4 adds complexity to the routing process, as multiple transactions are being handled at different stages at the same time. However, the benefits provided by the pipelining generally outweigh the cost in added complexity, especially in the context of a CAN system. In a typical (e.g., not CAN) networking protocol, the header may make up around 10% of the data packet. The remaining 90% of the data packet is data payload. In this case, there is still a significant amount of time to process the header information before the next data packet arrives, because the amount of data payload is so large relative to the header.

However, for CAN, the header of a CAN message may make up around 50% of the data packet (e.g., a CAN message may include eight bytes of header and eight bytes of payload). The relatively large size of the CAN header may make it difficult for the routing process to be performed at wire speed (e.g., to be able to handle incoming CAN messages as soon as they are received). This is because the CAN payload is relatively short (compared to the typical network protocol example described above), such that the next CAN message is arriving soon after the header of the first CAN message is received. In this way, the pipelined approach described in relation to FIG. 4 is particularly useful for routing messages that have a high percentage of header information (e.g., greater than 30% or so), such as the IEEE 1722 standard for CAN.

In some implementations, the clock frequency of the switched-CAN controller 104 may be increased, in order to perform the routing processes described herein quickly. While speeding up the clock frequency is a simpler approach than performing the pipelining described in relation to FIG. 4, increasing the clock frequency causes its own complications. For example, increasing the clock frequency creates more power dissipation. A benefit of using the pipelined approach without changing the clock frequency is that no additional problems arise related to power dissipation.

Figure 5:
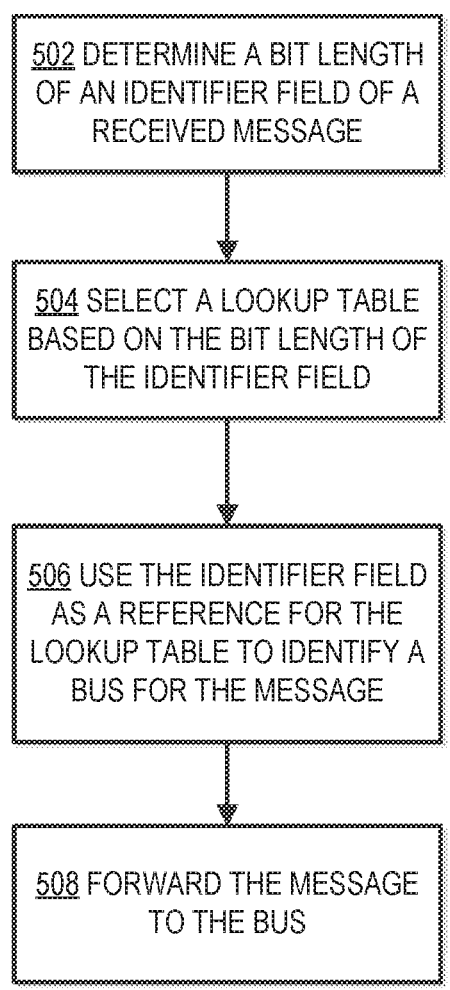
FIG. 5 is a high level flow chart for a process for routing a message in a network, in accordance with an embodiment of the present disclosure.

FIG. 5 shows a high level flow chart for a process 500 for routing a message in a network, in accordance with an embodiment of the present disclosure. In some embodiments, the network is in a CAN system, the message is a CAN message, and the message is routed to a CAN bus in the network.

At 502, the process 500 includes determining a bit length of an identifier field of a received message. The identifier field may be the can_id field 248 described in relation to FIGS. 1-4, and may have a specified bit length, such as 11 bits or 29 bits.

At 504, a lookup table is selected based on the bit length of the identifier field. In particular, based on whether the can_id field 248 is 11 bits long or 29 bits long, a different lookup table may be used. As is described above, when the bit length B of the can_id is relatively short (e.g., 11 bits long), the lookup table that is selected at 504 may have 2^B entries that are indexed by the can_id itself. Alternatively, when the bit length B of the can_id is relatively long (e.g., 29 bits long), the lookup table that is selected at 504 may have K entries, where K is significantly less than 2^B. In this case, the lookup table may include entries that have a field for the can_id and another field for other routing information, such as the table shown in FIG. 3.

At 506, the identifier field is used as a reference for the lookup table to identify a bus for the message. As was described in relation to 504, when the can_id is short, the can_id may be used to index the lookup table. In this case, the lookup table includes 2^B entries that may only include N-bit vectors, and the lookup process is a simple read function from a memory block. Alternatively, when the can_id is long, the can_id may be included as a field within the lookup table. When the entries of the lookup table are sorted in order of ascending (or descending) can_id, a binary search may be performed to identify the entry corresponding to the specific can_id, and, accordingly, to identify the N-bit vector that specifies the appropriate CAN buses 106.

In some embodiments, the N-bit vector obtained at 506 is input into a logical AND gate, which also receives an N-bit vector derived from another lookup table for the can_bus_id. The output of the logical AND gate is a final destination port vector, which specifies the final set of one or more CAN buses 106 over which to transmit the CAN message.

At 508, the message is forwarded to the bus. In particular, the bus may be specified by the N-bit vector and/or the final destination N-bit port vector that results from the lookup process. As was described in relation to FIG. 4, the forwarding of the CAN message to the bus may first involve adding the CAN message to the queue for the CAN bus 106. This may be done during a post-processing time, which follows the routing process. Because the routing and the post-processing are generally independent processes, these may be performed simultaneously for different CAN messages, which increases efficiency.

Figure 6:
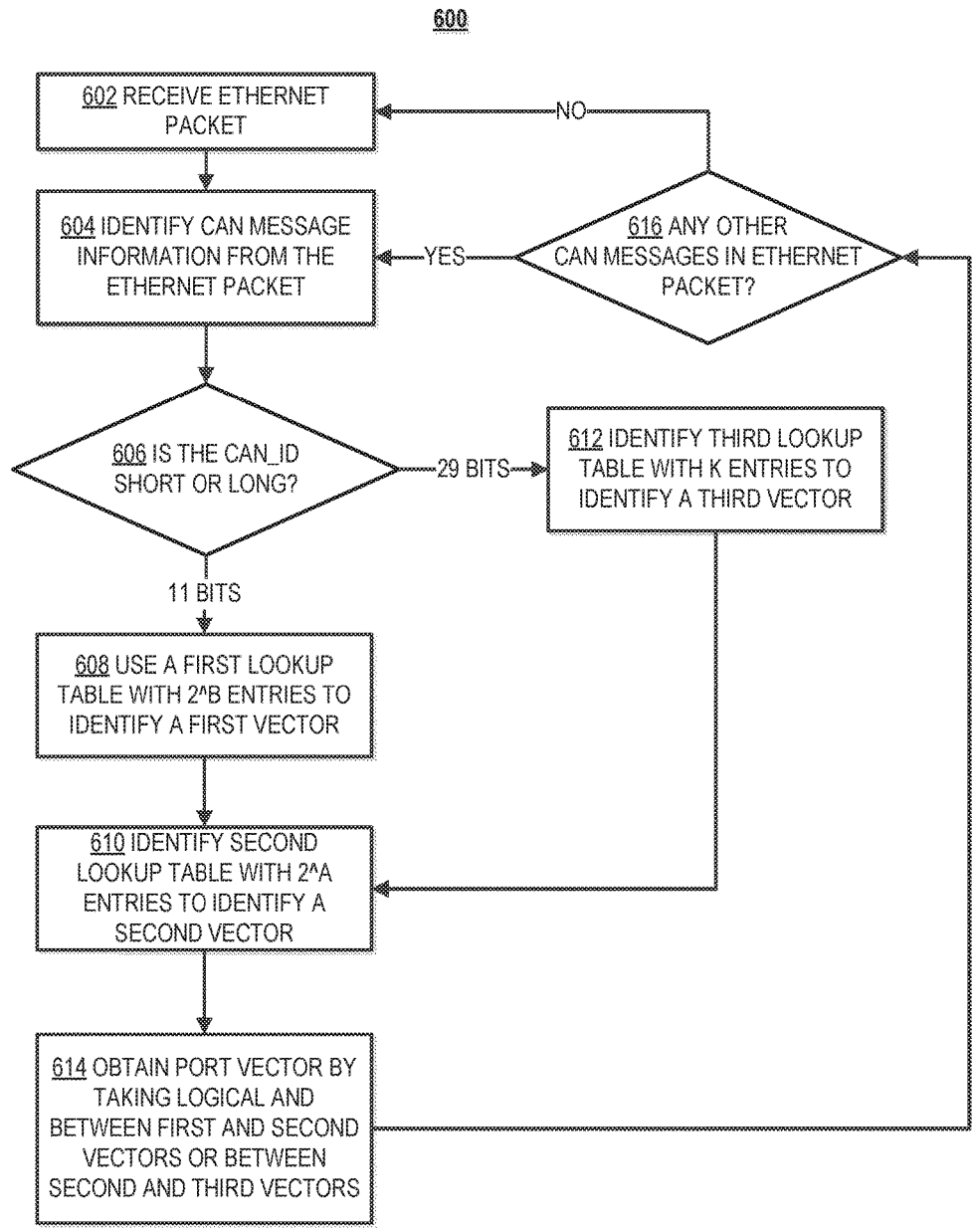
FIG. 6 is a flow chart for a process for identifying suitable ports for transmitting CAN messages, in accordance with an embodiment of the present disclosure.

FIG. 6 shows a flow chart for a process 600 for routing a set of messages in a network, in accordance with an embodiment of the present disclosure.

At 602, the process 600 includes receiving an Ethernet packet. In particular, the Ethernet packet may be received over the Ethernet port 102. An example portion of an Ethernet packet is described in relation to FIG. 2. As described above, the Ethernet packet may include an Ethernet header, followed by one or more CAN messages. FIG. 2 depicts an example portion of an Ethernet packet that relates to a CAN message, though additional CAN messages may be included within the same Ethernet packet. At 604, CAN message information is identified from the received Ethernet packet. In particular, the can_id 248 may be extracted from the CAN message information 222 from the Ethernet data frame 200. At 606, the process 600 determines whether the can_id in the CAN message information is short or long. In the examples described above, the can_id may be 11 bits long or 29 bits long, and the data field eff 236 is a binary value that is indicative of the bit length of the can_id 248.

If the can_id is short (e.g., 11 bits long), a first lookup table with 2048 entries is used at 608 to identify a first vector. In particular, when the can_id is relatively short (e.g., the bit length B of the can_id is small), the first lookup table has 2^B entries and is indexed by the can_id itself. The first vector is then the N-bit vector that is in the entry of the first lookup table that corresponds to the can_id. This N-bit vector specifies which of the N CAN buses 106 are connected to nodes 108 that should receive the CAN message.

Alternatively, if the can_id is long (e.g., 29 bits long), a third lookup table with K entries is used at 612 to identify a third vector. In particular, when the can_id is relatively long (e.g., the bit length B of the can_id is large), the third lookup table has K entries, where K is significantly less than 2^B. In this case, each of the K entries in the third lookup table (e.g., the routing table 300) includes the can_id as a first field, and an N-bit vector as a second field.

Regardless of the bit length B of the can_id, a second lookup table is identified at 610 with 2^A entries to identify a second vector. In particular, the second lookup table corresponds to the can_bus_id, which may include A bits. The second lookup table is indexed by the can_bus_id, and the second vector is the N-bit vector that is in the entry of the second lookup table that corresponds to the can_bus_id. This N-bit vector specifies which of the N CAN buses 106 are suitable for receiving the message. As is shown in FIG. 2, the can_bus_id 246 precedes the can_id 248. Accordingly, in some implementations, the identification of the second lookup table (e.g., the routing) for the can_bus_id is performed before the identification of the first or third lookup tables (e.g., the routing) for the can_id.

At 616, if it is determined that there are additional CAN messages in the Ethernet data packet, the process 600 returns to 604 to identify the CAN message information of the next CAN message. Otherwise, the process 600 returns to 602 to receive the next Ethernet packet.

While various embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

What is claimed is:

1. A system for routing a message in a Controller Area Network (CAN), the system comprising:
a memory; and
at least one processor configured to:
determine a bit length of an identifier field of a received CAN message;
select a first lookup table when the bit length of the identifier field corresponds to a first bit length;
select a second lookup table when the bit length of the identifier field corresponds to a second bit length greater than the first bit length;
identify a CAN bus among plural CAN buses for the CAN message by searching the selected first lookup table or second lookup table for a value in the selected table matching an identifier in the identifier field; and
forward the CAN message to the identified CAN bus according to the matching value in the selected table.

2. The system of claim 1, wherein the identifier field is a CAN identifier field, when the bit length of the identifier field is 11 bits the selected lookup table is the first lookup table, and when the bit length of the identifier field is 29 bits the selected lookup table is the second lookup table.

3. The system of claim 1, wherein the memory stores a plurality of lookup tables including the selected lookup table, wherein each lookup table in the plurality of lookup tables is associated with a corresponding bit length of the identifier field.

4. The system of claim 1, wherein the processor is further configured to:
select 2^B entries for the first lookup table, where B is the bit length of the identifier field, and the first lookup table is indexed by the identifier field.

5. The system of claim 1, wherein the processor is further configured to:
select K entries for the second lookup table, where K is less than 2^B, and B is the bit length of the identifier field.

6. The system of claim 5, wherein the K entries in the second lookup table are arranged in ascending order.

7. The system of claim 1, wherein the CAN message is a first CAN message and the CAN bus is a first CAN bus, and while the first CAN message is being forwarded to the first CAN bus, the at least one processor is further configured to:
identify a second identifier field of a second received CAN message; and
determine a bit length of the second identifier field.

8. The system of claim 7, wherein the at least one processor is further configured to:
select the first lookup table when the bit length of the second identifier field is the first bit length;
select the second lookup table when the bit length of the second identifier field is the second bit length;
identify a second CAN bus among plural CAN buses for the second CAN message by searching the selected first lookup table or second lookup table for a second value in the selected lookup table matching a second identifier in the second identifier field; and
forward the second CAN message to the identified second CAN bus according to the second matching value in the selected table.

9. A method of routing a CAN message in a Controller Area Network (CAN), the method comprising:
determining a bit length of an identifier field of a received CAN message;
selecting a first lookup table when the bit length of the identifier field is a first bit length;
selecting a second lookup table when the bit length of the identifier field is a second bit length greater than the first bit length;
identifying a CAN bus among plural CAN buses for the CAN message by searching the selected first lookup table or second lookup table for a value in the selected table matching an identifier in the identifier field; and
forwarding the CAN message to the identified CAN bus according to the matching value in the selected table.

10. The method of claim 9, wherein the identifier field is a CAN identifier field, when the bit length of the identifier field is 11 bits the selected lookup table is the first lookup table, and when the bit length of the identifier field is 29 bits the selected lookup table is the second lookup table.

11. The method of claim 9, further comprising storing a plurality of lookup tables including the selected lookup table in memory, wherein each lookup table in the plurality of lookup tables is associated with a corresponding bit length of the identifier field.

12. The method of claim 9, wherein the first lookup table has 2^B entries, B is the bit length of the identifier field, and the first lookup table is indexed by the identifier field.

13. The method of claim 9, wherein the second lookup table has K entries, K is less than 2^B, and B is the bit length of the identifier field.

14. The method of claim 13, wherein the K entries in the second lookup table are arranged in ascending order.

15. The method of claim 9, wherein the CAN message is a first CAN message and the CAN bus is a first CAN bus, and while the first CAN message is being forwarded to the first CAN bus, the method further comprises:
   identifying a second identifier field of a second received CAN message; and
   determining a bit length of the second identifier field.

16. The method of claim 15, further comprising:
   selecting the first lookup table when the bit length of the second identifier field is the first bit length;
   selecting the second lookup table when the bit length of the second identifier field is the second bit length greater than the first bit length;
   identifying a second CAN bus among plural CAN buses for the second CAN message by searching the selected first lookup table or second lookup table for a second value in the selected lookup table matching a second identifier in the second identifier field; and
   forwarding the second CAN message to the identified second CAN bus according to the second matching value in the selected table.

* * * * *